(12) United States Patent
Kim et al.

(10) Patent No.: US 8,830,925 B2
(45) Date of Patent: Sep. 9, 2014

(54) METHOD OF REPORTING CHANNEL QUALITY INFORMATION IN A WIRELESS COMMUNICATION SYSTEM

(75) Inventors: Ki Hwan Kim, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 496 days.

(21) Appl. No.: 13/054,895

(22) PCT Filed: Jul. 30, 2009

(86) PCT No.: PCT/KR2009/004240
§ 371 (c)(1),
(2), (4) Date: Jan. 19, 2011

(87) PCT Pub. No.: WO2010/016680
PCT Pub. Date: Feb. 11, 2010

(65) Prior Publication Data
US 2011/0122794 A1 May 26, 2011

Related U.S. Application Data

(60) Provisional application No. 61/087,181, filed on Aug. 8, 2008, provisional application No. 61/153,972, filed on Feb. 20, 2009.

(30) Foreign Application Priority Data

May 18, 2009 (KR) ........................ 10-2009-0043118

(51) Int. Cl.
| | |
|---|---|
| H04W 4/00 | (2009.01) |
| H04L 1/00 | (2006.01) |
| H04W 24/10 | (2009.01) |
| H04L 25/02 | (2006.01) |
| H04L 5/00 | (2006.01) |
| H04W 48/08 | (2009.01) |
| H04W 72/04 | (2009.01) |
| H04W 8/24 | (2009.01) |
| H04L 27/26 | (2006.01) |

(52) U.S. Cl.
CPC ............ *H04L 1/0026* (2013.01); *H04L 1/0029* (2013.01); *H04L 5/0037* (2013.01); *H04L 5/0007* (2013.01); *H04W 48/08* (2013.01); *H04W 24/10* (2013.01); *H04W 72/04* (2013.01); *H04W 8/24* (2013.01); *H04L 25/022* (2013.01); *H04L 27/2601* (2013.01)
USPC ............................ 370/329; 370/252; 370/281

(58) Field of Classification Search
USPC .......................................... 370/252, 281, 329
See application file for complete search history.

(56) References Cited

U.S. PATENT DOCUMENTS

| | | | |
|---|---|---|---|
| 7,184,703 B1 * | 2/2007 | Naden et al. ..................... | 455/10 |
| 7,912,133 B2 | 3/2011 | Cheon et al. | |

(Continued)

FOREIGN PATENT DOCUMENTS

| | | |
|---|---|---|
| EP | 1533966 A2 | 5/2005 |
| KR | 10-2005-0048861 A | 5/2005 |
| WO | WO 2007/020995 A1 | 2/2007 |

OTHER PUBLICATIONS

Ericsson, "Carrier Aggregation in LTE-Advanced," TSG-RAN WG1 #53bis, R1-082468, Agenda Item 12, Warsaw, Poland, Jun. 30-Jul. 4, 2008, 6 pages.

(Continued)

*Primary Examiner* — Hassan Kizou
*Assistant Examiner* — Deepa Belur
(74) *Attorney, Agent, or Firm* — Birch, Stewart, Kolasch & Birch, LLP (57) ABSTRACT

A method for reporting channel quality information in a wireless communication system, and a method for assigning radio resources according to the channel quality information are disclosed. A method for reporting channel quality information by a user equipment (UE) of a wireless communication system measures channel quality information of a downlink multi-carrier including a plurality of downlink component carriers, and transmits the measured channel quality information to a base station.

7 Claims, 6 Drawing Sheets

(56) References Cited

U.S. PATENT DOCUMENTS

| | | | |
|---|---|---|---|
| 8,050,227 B2 * | 11/2011 | Lee et al. ................... 370/329 | |
| 8,094,733 B2 * | 1/2012 | Kwon et al. .................. 375/260 | |
| 8,140,944 B2 | 3/2012 | Chen et al. | |
| 8,165,081 B2 | 4/2012 | Papasakellariou et al. | |
| 8,171,372 B2 | 5/2012 | Pan | |
| 8,209,576 B2 * | 6/2012 | Zhang ......................... 714/748 | |
| 8,259,848 B2 | 9/2012 | Malladi | |
| 8,289,908 B2 * | 10/2012 | Barriac ........................ 370/329 | |
| 8,457,235 B2 | 6/2013 | Ko et al. | |
| 2004/0227859 A1 | 11/2004 | Liang | |
| 2005/0128993 A1 | 6/2005 | Yu et al. | |
| 2005/0281226 A1 | 12/2005 | Lee et al. | |
| 2006/0274712 A1 * | 12/2006 | Malladi et al. ............... 370/345 | |
| 2007/0098093 A1 * | 5/2007 | Kwon et al. .................. 375/260 | |
| 2007/0218917 A1 | 9/2007 | Frederiksen et al. | |
| 2008/0051149 A1 | 2/2008 | Mehta et al. | |
| 2008/0095106 A1 * | 4/2008 | Malladi et al. ............... 370/329 | |
| 2008/0095223 A1 | 4/2008 | Tong et al. | |
| 2008/0310385 A1 * | 12/2008 | Iochi et al. ................... 370/345 | |
| 2009/0103447 A1 * | 4/2009 | Harada et al. ................ 370/252 | |
| 2009/0180561 A1 | 7/2009 | Kim et al. | |
| 2009/0245169 A1 | 10/2009 | Zhang et al. | |
| 2009/0262653 A1 | 10/2009 | Toda et al. | |
| 2011/0128942 A1 * | 6/2011 | Kim et al. ..................... 370/336 | |
| 2011/0274099 A1 * | 11/2011 | Kwon et al. .................. 370/338 | |
| 2012/0008585 A1 * | 1/2012 | Kwon et al. .................. 370/329 | |
| 2012/0014329 A1 * | 1/2012 | Kwon et al. .................. 370/328 | |
| 2012/0120838 A1 * | 5/2012 | Farajidana et al. ........... 370/252 | |
| 2013/0003681 A1 * | 1/2013 | Earnshaw et al. ............ 370/329 | |

OTHER PUBLICATIONS

Huawei, "Carrier Aggregation in Advanced E-UTRA," 3GPP TSG RAN WG1#53bis, R1-082448, Agenda Item 12. Study Item on LTE-Advanced, Warsaw, Poland, Jun. 30-Jul. 4, 2008, 4 pages.

Texas Instruments, "Design Aspects of UE Feedback," 3GPP TSG RAN WG1 50, R1-073423, Agenda Item 7.2.4, 7.4.5, Aug. 24, 2007, Athens, Greece, 5 pages.

* cited by examiner

METHOD OF REPORTING CHANNEL QUALITY INFORMATION IN A WIRELESS COMMUNICATION SYSTEM

This application is the National Phase of PCT/KR2009/004240 filed on Jul. 30, 2009, which claims priority under 35 U.S.C. 119(e) to U.S. Provisional Application No. 61/087,181 filed on Aug. 8, 2008 and U.S. Provisional Application No. 61/153,972 filed on Feb. 20, 2009, and under 35 U.S.C. 119(a) to Patent Application No. 10-2009-0043118 filed in Republic of Korea on May 18, 2009, all of which are hereby expressly incorporated by reference into the present application.

TECHNICAL FIELD

The present invention relates to a wireless communication system, and more particularly to a method for reporting channel quality information in a wireless communication system.

BACKGROUND ART

In order to effectively implement communication between a transmission end and a reception end, the transmission end must feed back channel information to the reception end. In general, downlink channel information is transmitted from a user equipment (UE) to a base station via an uplink, and uplink channel information is transmitted from a base station to a UE via a downlink. The above??mentioned channel information is referred to as a channel quality indicator (CQI). The CQI can be generated in various ways.

Figure 1:
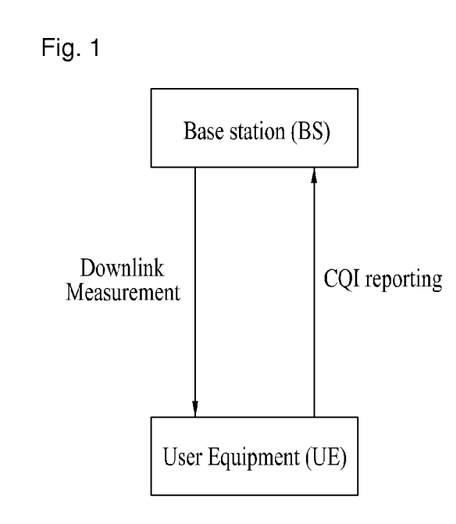
FIG. 1 is a conceptual diagram illustrating generation and transmission of a channel quality indicator.

FIG. 1 is a conceptual diagram illustrating generation and transmission of a channel quality indicator (CQI).

Referring to FIG. 1, a UE measures a downlink channel quality, and reports a channel quality indicator (CQI) value based on the measured downlink channel quality to a base station via a control channel. The base station performs downlink scheduling (UE selection, resource allocation or the like) according to the reported CQI.

In other words, when a base station allocates radio resources to a UE in a wireless communication system, the base station uses a CQI received from the UE.

The UE receives a pilot channel or the like from the base station, measures channel quality information such as a Signal to Interference Ratio (SIR) or the like about the received signal, and reports the measured channel quality information to the base station. The base station allocates radio resources to each base station using the channel quality information received from each UE.

The UE may periodically or aperiodically report channel quality information to the base station.

In addition, the UE may report channel quality information to the base station via a Physical Uplink Control CHannel (PUCCH) or a Physical Uplink Shared CHannel (PUSCH). The PUCCH and the PUSCH use different coding methods, wherein the PUCCH has high decoding performance superior to that of the PUSCH.

If there is a need for a UE to transmit a larger amount of control information than that capable of being transmitted via a physical uplink control channel (PUCCH), or if a UE desires to improve transmission performance of control information, the UE transmits channel quality information to the base station via a physical uplink shared channel (PUSCH).

In accordance with the related art, a UE can transmit channel quality information to a base station via a physical uplink shared channel (PUSCH) only when receiving a permission message from the base station.

A Long Term Evolution (LTE) system can support a system bandwidth from 1.25 MHz to a maximum of 20 MHz. Therefore, a method for transmitting channel quality information according to the related art has described a method for transmitting channel quality information of a 20 MHz ?? bandwidth.

However, a LTE??A system collects five 20 MHz bandwidths through carrier aggregation, and thus supports a 100 MHz bandwidth. Therefore, there is needed a method for transmitting channel quality information about the 100 MHz bandwidth.

DISCLOSURE OF INVENTION

Technical Problem

Accordingly, the present invention is directed to a method for reporting channel quality information and a method for assigning radio resources according to the channel quality information in a wireless communication system that substantially obviate one or more problems due to limitations and disadvantages of the related art.

As previously stated above, the related art has described a method for transmitting channel quality information about a 20 MHz bandwidth. However, a new system supports a multi-carrier bandwidth of 100 MHz, such that a method for transmitting channel quality information of a multi-carrier bandwidth is needed.

An object of the present invention is to provide a method for transmitting channel quality information of a multi-carrier bandwidth.

Another object of the present invention is to provide a method for transmitting channel quality information, which can be applied to a specific case in which the number of downlink component carriers is different from the number of uplink component carriers.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

Technical Solution

The object of the present invention can be achieved by providing a method for reporting channel quality information in a wireless communication system, the method including measuring channel quality information of a downlink multi-carrier including a plurality of downlink component carriers, and transmitting the measured channel quality information to a base station.

In this case, the channel quality information of the downlink multi-carrier may be indicative of channel quality information of a whole frequency band of the downlink multi-carrier.

Each of the downlink component carriers may include a plurality of lower bands, and the measuring of the channel quality information of the downlink multi-carrier may includes measuring channel quality information of at least one lower band having good channel quality information among all frequency bands of the downlink multi-carrier.

The channel quality information of the downlink multi-carrier may be channel quality information of a whole frequency band of a component carrier arbitrarily selected by the UE.

Each of the downlink component carriers may include a plurality of lower bands, and the channel quality information of the downlink multi-carrier may be equal to channel quality information of at least one lower band having good channel quality information among a whole frequency band of the component carrier arbitrarily selected by the UE.

In addition, the channel quality information of the downlink multi-carrier may be equal to channel quality information of the whole frequency band of a component carrier predetermined based on a transmission time interval (TTI) between the UE and the base station.

Each of the downlink component carriers may include a plurality of lower bands, and the channel quality information of the downlink multi-carrier may be equal to channel quality information of at least one lower band having good channel quality information among all frequency bands of a component carrier predetermined based on a transmission time interval (TTI) between the UE and the base station.

Advantageous Effects

According to embodiments of the present invention, the present invention is able to transmit channel quality information of a multi-carrier bandwidth, and can also be applied to a specific case in which the number of downlink component carriers is different from the number of uplink component carriers.

Effects to be realized by embodiments of the present invention are not limited to the above-mentioned effects, and other effects not mentioned in the above-mentioned description may be easily appreciated by those skilled in the art to which the present invention pertains without difficulty.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term ' . . . part', " . . . unit', 'module' or the like means a unit for processing at least one function or operation, and this unit may be implemented by hardware, software, or a combination thereof.

Figure 2:
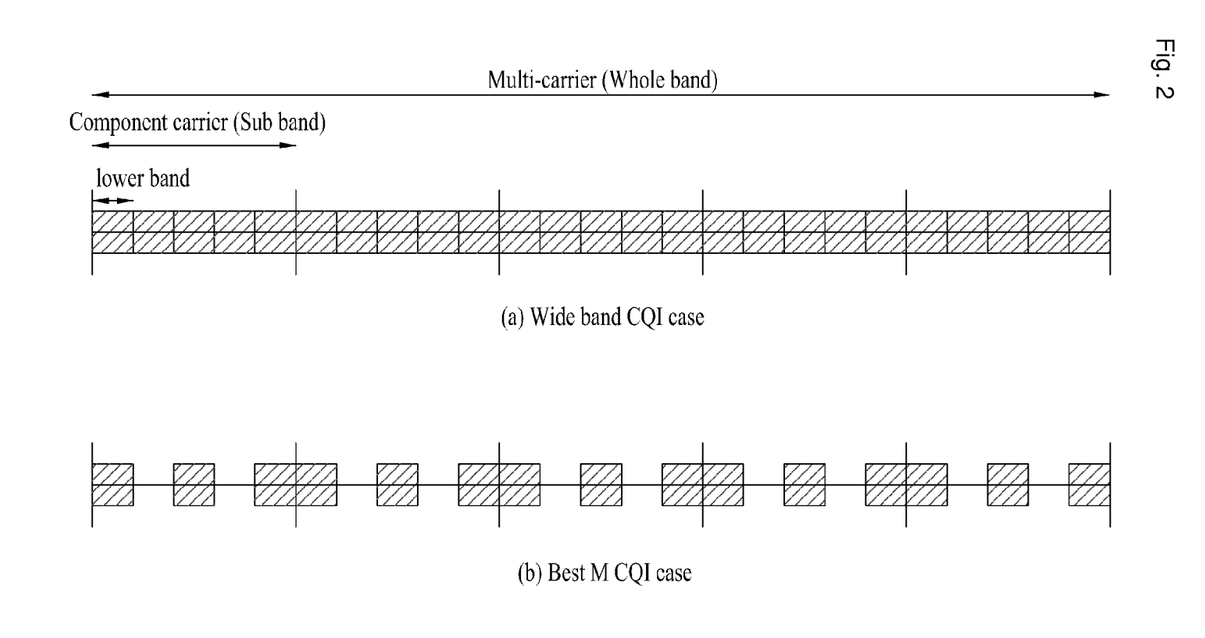
FIG. 2(a) is a conceptual diagram illustrating a method for measuring channel quality information about the whole part of a multi-carrier in case of using a method for transmitting channel quality information according to the present invention.
FIG. 2(b) is a conceptual diagram illustrating a method for measuring channel quality information of at least one lower band having good channel quality information among multiple carriers (i.e., a multi-carrier) in case of using a method for transmitting channel quality information according to the present invention.
Figure 3:
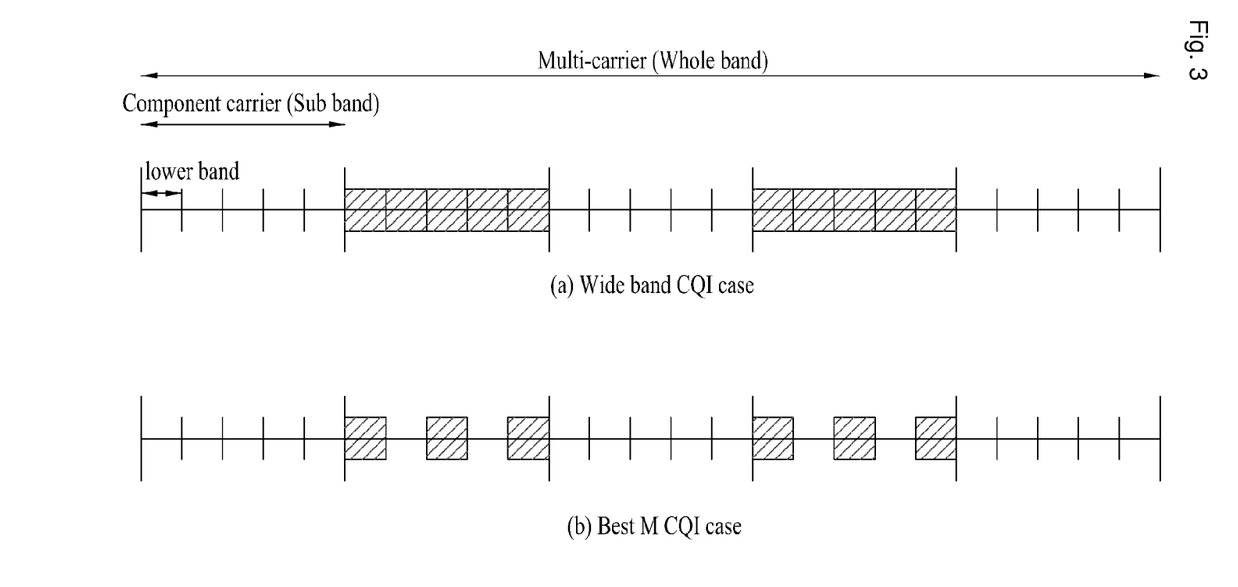
FIG. 3(a) is a conceptual diagram illustrating a method for measuring channel quality information of a total of selected component carriers in case of using a method for transmitting channel quality information according to the present invention.
FIG. 3(b) is a conceptual diagram illustrating a method for measuring channel quality information of at least one lower band having good channel quality information among selected component carriers in case of using a method for transmitting channel quality information according to the present invention.
Figure 4:
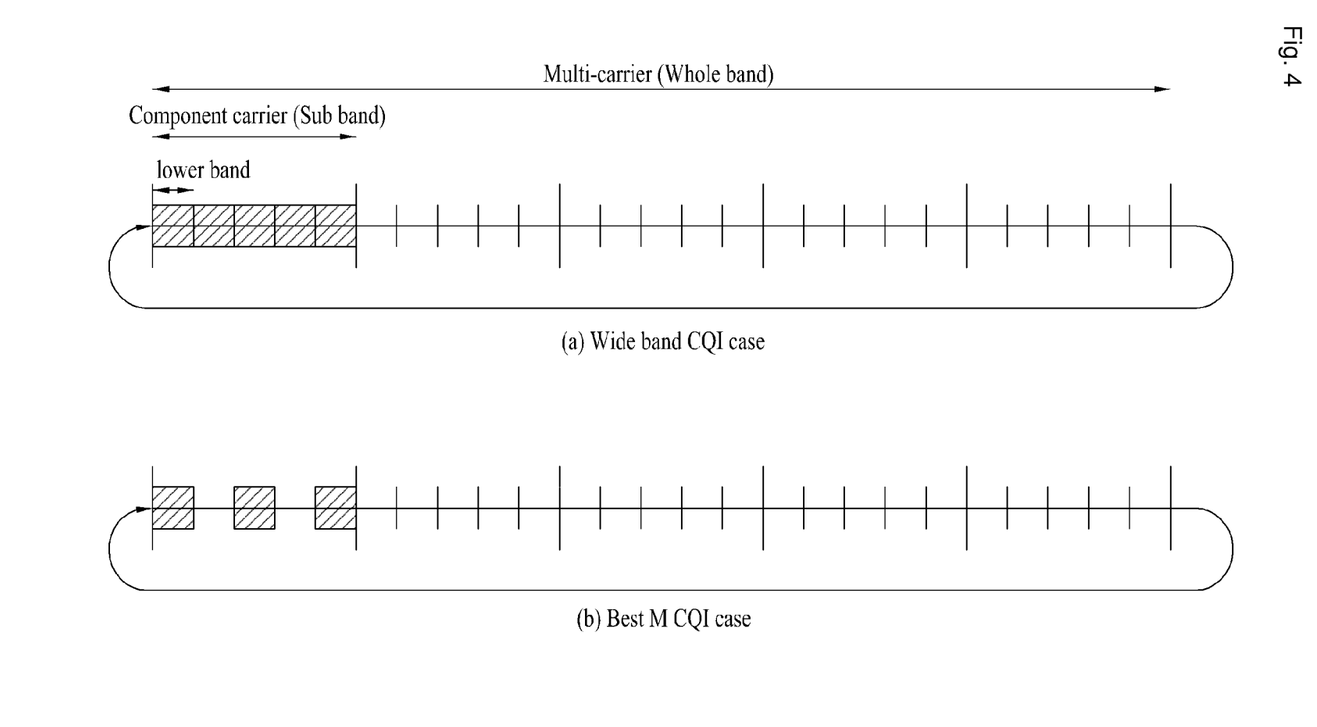
FIG. 4(a) is a conceptual diagram illustrating a method for measuring channel quality information of a total of cyclically-decided component carriers in case of using a method for transmitting channel quality information according to the present invention.
FIG. 4(b) is a conceptual diagram illustrating a method for measuring channel quality information of at least one lower band having good channel quality information among cyclically-decided component carriers in case of using a method for transmitting channel quality information according to the present invention.

A method for measuring channel quality information according to embodiments of the present invention will hereinafter be described with reference to FIGS. 2 to 4.

FIG. 2(a) is a conceptual diagram illustrating a method for measuring channel quality information about the whole part of a multi-carrier in case of using a method for transmitting channel quality information according to the present invention. FIG. 2(b) is a conceptual diagram illustrating a method for measuring channel quality information of at least one lower band having good channel quality information among multiple carriers (i.e., a multi-carrier) in case of using a method for transmitting channel quality information according to the present invention.

In FIGS. 2(a) and 2(b), the term 'multi-carrier' means the whole frequency band used by a base station, and the multi-carrier has the same meaning as the whole band. For example, in case of using an LTE-A system, a multi-carrier may be considered to be 100 MHz.

The term 'component carrier' may indicate each element carrier included in the multi-carrier. In other words, a plurality of component carriers is included in a multi-carrier through carrier aggregation. In addition, the component carrier includes a plurality of lower bands. In this case, if the term 'multi-carrier' is replaced with another term 'whole band', the term 'component carrier' may be replaced with another term 'sub band', and the term 'lower band' may be replaced with another term 'partial band'. In addition, 'carrier aggregation' may also be referred to as 'bandwidth aggregation'.

Carrier aggregation means that a bandwidth is extended by collecting a plurality of carriers so as to increase a data transfer rate (also called a data rate). For example, in case of using the LTE system, one carrier corresponds to 20 MHz. In case of the LTE-A system, five 20 MHz carriers are collected so that the whole bandwidth is extended to 100 MHz. Also, the carrier aggregation means that carriers located in different frequency bands are aggregated.

FIGS. 2(a) and 2(b) are conceptual diagrams illustrating methods for allowing a UE to measure channel quality information on the basis of the whole part of a multi-carrier.

Referring to FIG. 2(a), a UE measures a CQI about the whole frequency band of a multi-carrier. In this case, the UE may calculate the sum of channel quality information about the whole frequency band and then measure the CQI according to the calculated result. Otherwise, the UE may also measure channel quality information of each of the component carriers and then report the measured channel quality information to a base station.

Referring to FIG. 2(b), a UE measures channel quality information of at least one lower band having good channel quality information among the whole frequency band of a multi-carrier, and transmits the measured channel quality information to the base station. In this case, the UE may calculate the sum of channel quality information of at least one lower band having good channel quality information about the whole part of the multi-carrier and then measure the channel quality information according to the calculated result. Otherwise, the UE may also measure channel quality information of at least one lower band having good channel quality information about each of the component carriers and then transmit the measured channel quality information to a base station.

As shown in FIGS. 2(a) and 2(b), if a UE measures channel quality information on the basis of the whole part of a multi-carrier, there is an advantage in that the UE can transmit channel quality information about the whole frequency band of the multi-carrier to the base station during a single transmission time interval (TTI) (1 TTI).

At a specific time at which the base station requests channel quality information from the UE or at a predetermined period between the UE and the base station, the UE measures channel quality information measured by the methods of FIGS. 2(a) and 2(b), and then transmits the measured channel quality information to the base station.

As can be seen from FIGS. 2(a) and 2(b), the base station is able to transmit a control signal to the UE, where the control signal commands the UE to measure and report channel quality information of the whole band. In this case, the above-mentioned control signal for measuring and reporting the channel quality information about the whole band may include wideband channel quality information (Wideband CQI), Best M CQI, and a Best M CQI index.

FIG. 3(a) is a conceptual diagram illustrating a method for measuring channel quality information of a total of selected component carriers in case of using a method for transmitting channel quality information according to the present invention. FIG. 3(b) is a conceptual diagram illustrating a method for measuring channel quality information of at least one lower band having good channel quality information among selected component carriers in case of using a method for transmitting channel quality information according to the present invention.

FIGS. 3(a) and 3(b) are conceptual diagrams illustrating methods for selecting at least one component carrier and measuring channel quality information on the basis of the selected component carriers. Accordingly, when the UE transmits channel quality information to the base station, it also transmits indication information (i.e., an indicator) of the selected component carriers to the base station.

Referring to FIG. 3(a), the UE measures channel quality information of the selected component carriers. In this case, the UE may calculate the sum of channel quality information about the selected component carriers and then measure the channel quality information according to the calculated result. Otherwise, the UE may also measure channel quality information of each of the selected component carriers and then report the measured channel quality information to the base station.

Referring to FIG. 3(b), a UE measures channel quality information of at least one lower band having good channel quality information about each of the selected component carriers, and transmits the measured channel quality information to the base station. In this case, the UE may calculate the sum of channel quality information of at least one lower band having good channel quality information about each of the selected component carriers and then measure the channel quality information according to the calculated result. Otherwise, the UE may also measure channel quality information of at least one lower band having good channel quality information about each of the selected component carriers and then transmit the measured channel quality information to the base station.

As shown in FIGS. 3(a) and 3(b), if a UE measures channel quality information on the basis of the selected component carriers, the UE may transmit channel quality information of the selected component carrier selected in a single TTI (1 TTI), and may also reduce an amount of overhead.

At a specific time at which the base station requests channel quality information from the UE or at a predetermined period between the UE and the base station, the UE measures channel quality information measured by the methods of FIGS. 3(a) and 3(b), and then transmits the measured channel quality information to the base station.

As can be seen from FIGS. 3(a) and 3(b), the base station is able to transmit a control signal to the UE, where the control signal commands the UE to measure and report channel quality information of the selected component carrier. In this case, the above-mentioned control signal for measuring and reporting the channel quality information about the selected component carrier may include a component carrier index, wideband channel quality information (Wideband CQI), a Best M CQI, and a Best M CQI index.

FIG. 4(a) is a conceptual diagram illustrating a method for measuring channel quality information of a total of cyclically-decided component carriers in case of using a method for transmitting channel quality information according to the present invention. FIG. 4(b) is a conceptual diagram illustrating a method for measuring channel quality information of at least one lower band having good channel quality information among cyclically-decided component carriers in case of using a method for transmitting channel quality information according to the present invention.

As can be seen from FIGS. 4(a) and 4(b), a UE and a base station cyclically pre-decide a component carrier according to each TTI, and measure channel quality information on the basis of a component carrier decided in a corresponding TTI.

In other words, the UE transmits channel quality information of the component carrier decided by each TTI to the base station. Therefore, since the component carrier decided by each TTI is pre-recognized by the UE and the base station, there is no need for the UE to transmit a component carrier indicator to the base station, resulting in reduction in overhead.

Referring to FIG. 4(a), a UE measures channel quality information about the component carrier decided based on a TTI.

Referring to FIG. 4(b), a UE measures channel quality information of at least one lower band having good channel quality information among the component carrier decided based on a TTI, and transmits the measured channel quality information.

At a specific time at which the base station requests channel quality information from the UE or at a predetermined period between the UE and the base station, the UE measures channel quality information measured by the methods of FIGS. 4(a) and 4(b), and then transmits the measured channel quality information to the base station.

As can be seen from FIGS. 4(a) and 4(b), the base station is able to transmit a control signal to the UE, where the control signal commands the UE to measure and report channel quality information of a component carrier decided based on a TTI. In this case, the above-mentioned control signal for measuring and reporting the channel quality information about the component carrier decided based on the TTI may include a start component carrier index, a component carrier cyclic period, a wideband Wideband CQI, a Best M CQI, and a Best M CQI index.

Although FIGS. 4(a) and 4(b) have described exemplary cases in which the UE and the base station cyclically decide the component carrier according to TTI information, the UE and the base station may cyclically pre-decide the component carrier according to a transmission channel, and may transmit channel quality information of a corresponding component carrier via the corresponding transmission channel.

In other words, if the UE transmits channel quality information via a plurality of transmission channels, specific information indicating which component carrier will be used to transmit channel quality information via each of several transmission channels is predetermined between the UE and the base station, and therefore the UE can transmit each channel quality information of several component carriers via a predetermined transmission channel.

A method for transmitting channel quality information according to embodiments of the present invention will hereinafter be described with reference to FIGS. 5 and 6.

Figure 5:
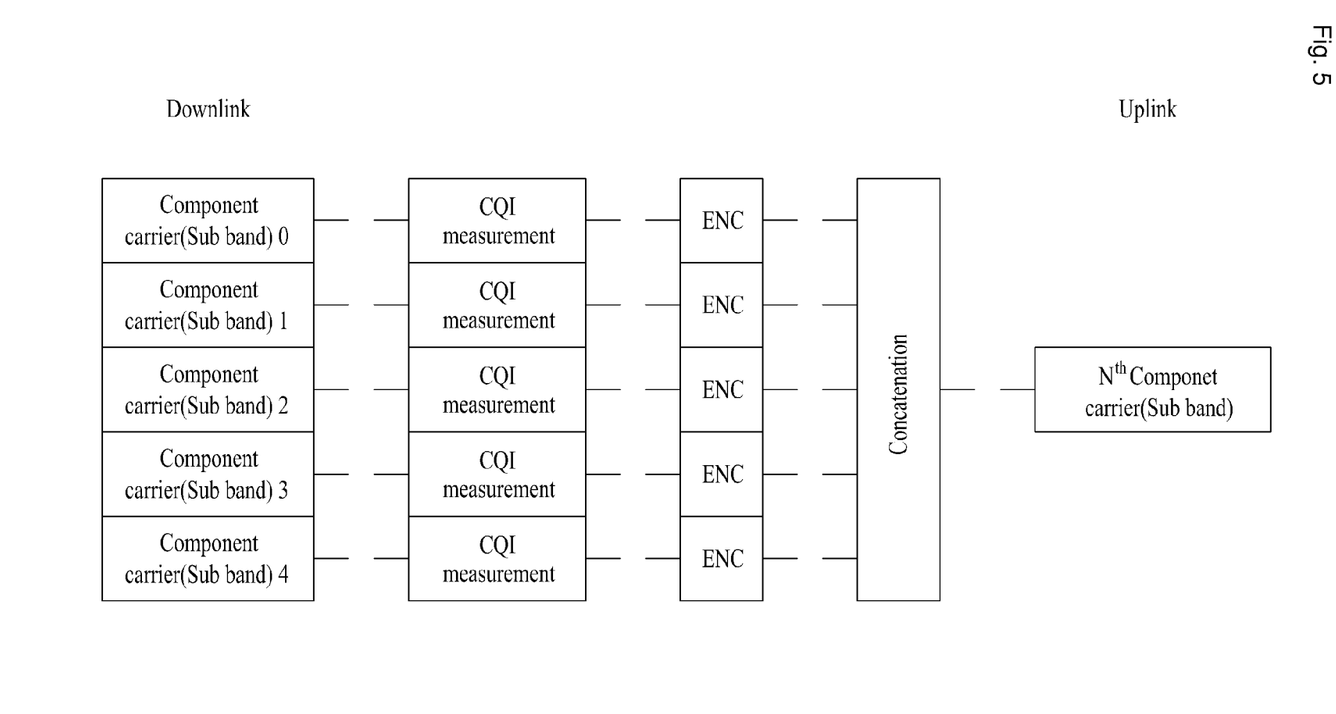
FIG. 5 is a conceptual diagram illustrating a method for transmitting channel quality information according to one embodiment of the present invention.

FIG. 5 is a conceptual diagram illustrating a method for transmitting channel quality information according to one embodiment of the present invention.

Referring to FIG. 5, a UE measures and codes channel quality information of each downlink component carrier, performs concatenation of channel quality information of the coded component carriers, and transmits the concatenated result via an N-th uplink component carrier. In this case, the UE may transmit channel quality information either via a plurality of uplink component carriers or via a single uplink component carrier.

In FIG. 5, the number of downlink component carriers may be changed to another number as necessary. In other words, when channel quality information of a specific component carrier is not measured, the channel quality information of the corresponding component carrier is excluded from the coding and concatenation process. Thus, in case of using a system based on a multi-carrier composed of a plurality of component carriers, the number of downlink component carriers may be symmetrical or asymmetrical to the number of uplink component carriers. In accordance with embodiments of the present invention, not only in the first case in which the number of uplink component carriers is symmetrical to the number of downlink component carriers, but also in the second case in which the number of uplink component carriers is asymmetrical to the number of downlink component carriers, the present invention is able to transmit channel quality information via an uplink.

In addition, the CQI transmission method of FIG. 5 has an advantage in that channel quality information of each component carrier can be decoded.

Figure 6:
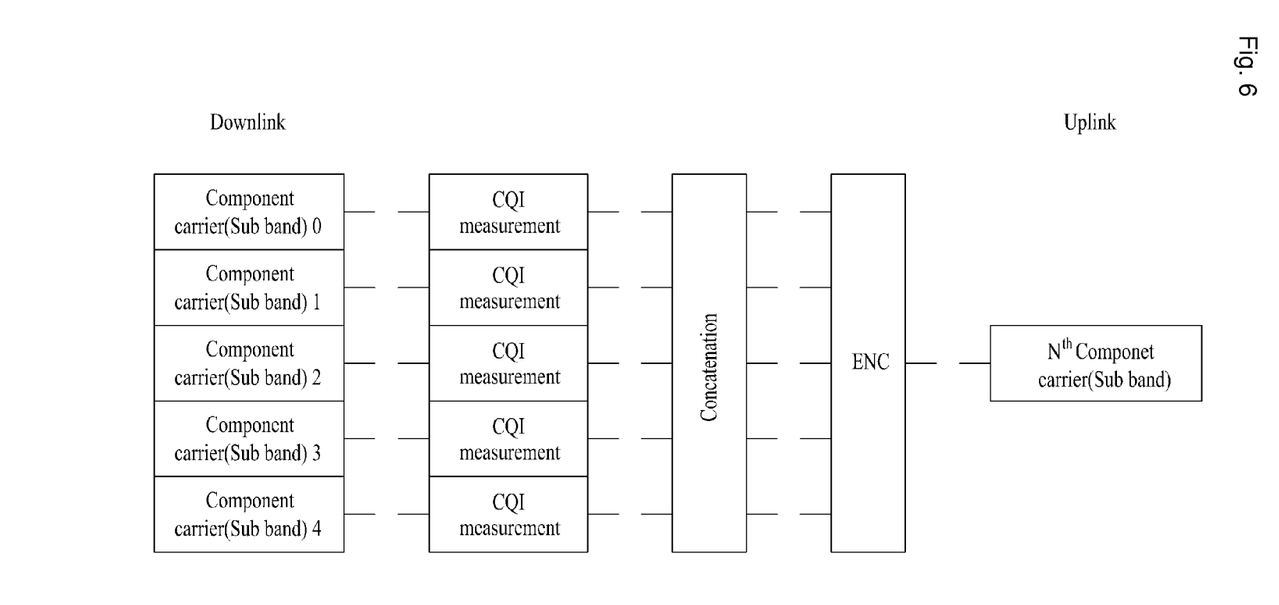
FIG. 6 is a conceptual diagram illustrating a method for transmitting channel quality information according to another embodiment of the present invention.

FIG. 6 is a conceptual diagram illustrating a method for transmitting channel quality information according to another embodiment of the present invention.

Referring to FIG. 6, a UE measures channel quality information of each downlink component carrier, performs concatenation of the channel quality information of each component carrier, codes the concatenated channel quality information, and transmits the coded channel quality information via an uplink N-th component carrier. In this case, it should be noted that the UE may transmit channel quality information either via a plurality of uplink component carriers or via a single uplink component carrier.

In FIG. 6, the number of downlink component carriers may be changed to another number as necessary. In other words, when channel quality information of a specific component carrier is not measured, the channel quality information of the corresponding component carrier is excluded from the coding and concatenation process. Thus, in case of using a system based on a multi-carrier composed of a plurality of component carriers, the number of downlink component carriers may be symmetrical or asymmetrical to the number of uplink component carriers. In accordance with embodiments of the present invention, not only in the first case in which the number of uplink component carriers is symmetrical to the number of downlink component carriers, but also in the second case in which the number of uplink component carriers is asymmetrical to the number of downlink component carriers, the present invention is able to transmit channel quality information via an uplink.

In addition, the CQI transmission method of FIG. 6 has an advantage in that channel quality information of each component carrier is concatenated and coded, resulting in improved decoding performance.

In the methods of FIGS. 5 and 6, a UE has been designed to transmit only the channel quality information, but the channel quality information, ACK/NACK information, rank indication (RI) information and the like may be entirely or partially joint-encoded or separate-encoded, such that the joint-encoded or separate-encoded result may be transmitted from the UE to the base station.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are contained in the scope of the present invention.

It is apparent that the present invention may be embodied by a combination of claims which do not have an explicit cited relation in the appended claims or may include new claims by amendment after application.

INDUSTRIAL APPLICABILITY

As apparent from the above description, the present invention is able to transmit channel quality information of a multi-carrier bandwidth, and can also be applied to a specific case in which the number of downlink component carriers is different from the number of uplink component carriers.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for encoding control information by a user equipment (UE) in a wireless communication system, the method comprising:

providing a plurality of Channel Quality Information (CQIs), a plurality of Rank Indicators (RIs) and a plurality of Acknowledgements/Negative-Acknowledgements (ACK/NACKs) for a plurality of downlink carriers;

concatenating the plurality of CQIs;

encoding the concatenated plurality of CQIs, at least one RI and at least one ACK/NACK, separately; and transmitting the encoded plurality of CQIs, the encoded at least one RI and the at least one ACK/NACK on only one uplink carrier.

2. The method according to claim 1, wherein the step of providing comprises:

measuring the plurality of CQIs for the plurality of downlink carriers, wherein the plurality of downlink carriers are comprised as a whole frequency band.

3. The method according to claim 1, wherein the step of providing comprises:

measuring the plurality of CQIs for the plurality of downlink carriers, wherein the plurality of downlink carriers have good channel qualities among all downlink carriers.

4. The method according to claim 1, wherein the step of providing comprises:

selecting the plurality of downlink carriers among all downlink carriers, and measuring the plurality of CQIs for the plurality of downlink carriers.

5. The method according to claim 1, wherein the step of providing comprises:

selecting the plurality of downlink carriers among all downlink carriers, and measuring the plurality of CQIs for the plurality of downlink carriers, wherein the plurality of downlink carriers have good channel qualities among all downlink carriers.

6. The method according to claim 4, wherein the step of measuring is performed according to a transmission time interval (TTI).

7. The method according to claim 5, wherein the step of selecting is performed according to a cyclically-decided scheme.

* * * * *

UNITED STATES PATENT AND TRADEMARK OFFICE
CERTIFICATE OF CORRECTION

| | | |
|---|---|---|
| PATENT NO. | : 8,830,925 B2 | Page 1 of 1 |
| APPLICATION NO. | : 13/054895 | |
| DATED | : September 9, 2014 | |
| INVENTOR(S) | : Ki Hwan Kim et al. | |

It is certified that error appears in the above-identified patent and that said Letters Patent is hereby corrected as shown below:

IN THE CLAIMS:

Claim 1, at column 10, line 2, after "the" insert --encoded--.

Signed and Sealed this
Ninth Day of December, 2014

Michelle K. Lee
*Deputy Director of the United States Patent and Trademark Office*